United States Patent
Colibert (10) Patent No.: US 6,629,701 B1
(45) Date of Patent: *Oct. 7, 2003

(54) LOAD LEVELING WEIGHT DISTRIBUTING HITCH

(75) Inventor: Floyd A. Colibert, West Jordan, UT (US)

(73) Assignee: Colibert Enterprises, Salt Lake City, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,670

(22) Filed: Jan. 12, 1998

(51) Int. Cl.$^7$ ................................................. B60D 1/01
(52) U.S. Cl. ................................. 280/455.1; 280/405.1
(58) Field of Search ...................... 280/405.1, 406.2, 280/432, 455.1, 511, 407

(56) References Cited

U.S. PATENT DOCUMENTS

| | | | | |
|---|---|---|---|---|
| 2,817,541 A | * | 12/1957 | Mathisen | 280/406.2 |
| 2,952,475 A | * | 9/1960 | Reese | 280/406.2 |
| 3,151,879 A | * | 10/1964 | Bock | 280/406.2 |
| 3,471,169 A | * | 10/1969 | Palage et al. | 280/406.2 |
| 3,600,004 A | * | 8/1971 | Newkirk | 280/455.1 |
| 3,645,560 A | | 2/1972 | Steele | 280/482 |
| 3,649,046 A | | 3/1972 | Mathisen | 280/406 A |
| 3,679,231 A | | 7/1972 | Derr, Jr. | 280/406 A |
| 3,679,232 A | * | 7/1972 | Weber | 280/406.2 |
| 3,690,699 A | | 9/1972 | Derr, Jr. | 280/446 B |
| 3,692,331 A | | 9/1972 | Vegors | 280/405 R |
| 3,700,261 A | | 10/1972 | Suckow | 280/406 A |
| 3,700,262 A | | 10/1972 | Suckow | 280/406 A |
| 3,730,554 A | | 5/1973 | Saunders | 280/406 A |
| 3,731,746 A | | 5/1973 | Walberg | 172/9 |
| 3,731,950 A | | 5/1973 | Burcham | 280/406 A |
| 3,756,618 A | * | 9/1973 | Lewis | 280/455.1 |
| 3,778,088 A | | 12/1973 | Alexander | 280/406 A |
| 3,779,407 A | | 12/1973 | Gillem | 214/86 A |
| 3,825,132 A | | 7/1974 | Colangelo | 214/86 A |
| 3,847,228 A | | 11/1974 | Slosiarek et al. | 172/450 |
| 3,871,686 A | | 3/1975 | Rendessy | 280/446 B |
| 3,910,604 A | | 10/1975 | Abromavage et al. | 280/406 A |
| 3,948,567 A | | 4/1976 | Kasselmann et al. | 303/7 |
| 3,964,768 A | | 6/1976 | Reynolds | 280/495 |
| 3,989,269 A | | 11/1976 | Rendessy | 280/446 B |
| 4,023,863 A | | 5/1977 | Sisson et al. | 303/7 |
| 4,025,085 A | | 5/1977 | Jacobs | 280/446 B |
| 4,049,288 A | | 9/1977 | Young | 280/406 A |
| 4,053,174 A | | 10/1977 | Guettler, Jr. | 280/406 A |
| 4,165,885 A | | 8/1979 | Good et al. | 280/446 B |
| 4,198,073 A | | 4/1980 | Olsen | 280/406 A |
| 4,211,427 A | | 7/1980 | Young et al. | 280/406 A |
| 4,213,627 A | | 7/1980 | Thompson | 280/406 A |
| 4,312,516 A | | 1/1982 | Olsen | 280/406 A |
| 4,411,444 A | | 10/1983 | Holloway | 280/405 A |
| 4,637,770 A | | 1/1987 | Swadell | 414/495 |

(List continued on next page.)

Primary Examiner—Daniel G. DePumpo
(74) Attorney, Agent, or Firm—Thorpe North & Western, LLP (57) ABSTRACT

A load leveling weight distributing hitch which provides enhanced flexibility of attachment and removal is described. This invention is directed to load leveling weight distribution hitches with enhanced strength and which are easy to install and adjust, without the use of special tools or equipment. This invention addresses the attachment of the spring bars commonly used with load leveling hitches by presenting a quick connect/quick disconnect which permits the user to easily install the spring bars without the use of special tools. Additionally, this invention provides a thumb screw adjustment for modifying the pitch angle of the ball hitch. This invention also provides a spring bar lift which provides a novel locking mechanism as well as a chain retention device for maintaining the chain tension during sway.

10 Claims, 7 Drawing Sheets

U.S. PATENT DOCUMENTS

| | | | |
|---|---|---|---|
| 4,687,219 A | 8/1987 | Rendzio | 280/414.1 |
| 4,711,106 A | 12/1987 | Johnson | 70/34 |
| 4,714,265 A | 12/1987 | Franklin | 280/491 D |
| 4,722,542 A | 2/1988 | Hensley | 280/447 |
| 4,811,965 A * | 3/1989 | Eubanks | 280/455.1 |
| 4,815,752 A | 3/1989 | Young et al. | 280/406.2 |
| 5,184,839 A | 2/1993 | Guedry | 280/475 |
| 5,284,038 A | 2/1994 | Johnson | 70/232 |
| 5,363,924 A | 11/1994 | Foley et al. | 172/326 |
| 5,375,867 A | 12/1994 | Kass et al. | 280/457 |
| 5,421,599 A | 6/1995 | Maines | 280/406.2 |
| 5,451,088 A | 9/1995 | Broad | 296/26 |
| 5,454,550 A | 10/1995 | Christopherson | 267/221 |
| 5,465,991 A | 11/1995 | Kass et al. | 280/457 |
| 5,489,111 A | 2/1996 | Collins | 280/495 |
| 5,536,131 A | 7/1996 | Behr | 414/495 |
| 5,562,298 A | 10/1996 | Kass et al. | 280/406.2 |
| 5,575,492 A | 11/1996 | Stone | 280/475 |
| 5,580,076 A | 12/1996 | DeRoule et al. | 280/406.2 |
| 5,615,813 A | 4/1997 | Ouellette | 224/405 |
| 5,628,525 A | 5/1997 | Kass et al. | 280/406.2 |
| 5,647,603 A | 7/1997 | Kass et al. | 280/406.1 |
| 5,660,409 A * | 8/1997 | Hensley | 280/455.1 |

* cited by examiner

FIG. 2b
SECTION A-A

FIG. 3c
SECTION A-A

FIG. 4b
SECTION A-A

FIG. 7b
SECTION A-A

LOAD LEVELING WEIGHT DISTRIBUTING HITCH

BACKGROUND OF THE INVENTION

1. Field of the Invention

This invention relates to hitch systems for trailers. More specifically, this invention relates to hitch systems for ball-type couplers, which provide for load leveling, weight distribution, tilt angle ball adjustment, a new and improved means for installing and removing the spring bar components of the invention as well as a new and improved device for lifting and securing the spring bar components of the invention.

2. Description of the Related Art

A variety of hitch assemblies for evenly distributing the tongue weight of a trailer are well known in the art. Commonly such hitch assemblies include a hitch head, spring bars, bar restraining sockets, and lift units. The head provides the ball mount, the towing vehicle attachment and spring bar attachments. Typical such hitch assemblies use substantially L-shaped spring bars, or use substantially rectangular sockets. Also, if ball pivot adjustment is provided, it requires that the user unbolt, remove and relocate the hitch head. Such existing load leveling or weight distributing hitches are generally mechanically complex with a large number of bolt and nut attachment to fix the hitch together. Mechanical complexity has the disadvantage of being generally less reliable. Also, a disadvantage of the prior weight distributing hitches is that it is relatively difficult for the user to attach the spring bars to the hitch head or for the user to remove the spring bars from the hitch head. This problem makes it significantly more difficult for the user to attach a trailer to a towing vehicle using load leveling hitches. Prior load leveling hitches provide limited or no tension adjustment capability.

For general background material, the reader is directed to U.S. Pat. Nos. 3,645,560, 3,649,046, 3,679,231, 3,690,699, 3,692,331, 3,700,261, 3,700,262, 3,730,554, 3,731,746, 3,731,950, 3,778,088, 3,779,407, 3,825,132, 3,847,228, 3,871,686, 3,910,604, 3,964,768, 3,948,567, 3,989,269, 4,023,863, 4,025,085, 4,049,288, 4,053,174, 4,165,885, 4,198,073, 4,211,427, 4,213,627, 4,275,897, 4,312,516, 4,411,444, 4,637,770, 4,687,219, 4,711,106, 4,714,265, 4,722,542, 4,815,752, 5,184,839, 5,284,038, 5,363,924, 5,375,867, 5,421,599, 5,451,088, 5,454,550, 5,465,991, 5,489,111, 5,536,131, 5,562,298, 5,575,492, 5,580,076, 5,615,813, 5,628,525, 5,647,603, each of which is hereby incorporated by reference in its entirety for the material disclosed therein.

SUMMARY OF THE INVENTION

It is desirable to provide a load leveling weight distributing hitch system for use in towing trailers where the attachment and removal of the spring bars is facilitated and can be accomplished by hand. Moreover, it is desirable to provide a load leveling weight distributing hitch system which provides the capability of spring bar tension adjustment. It is also desirable to provide a load leveling weight distributing hitch system which provides a thumb screw adjustment of the ball hitch pitch.

Accordingly, it is an object of this invention to provide a load leveling weight distributing hitch system which provides a quick connect, quick disconnect for the spring bars.

It is another object of this invention to provide a load leveling weight distributing hitch system which provides the capability of adjusting the tension of the spring bars.

A further object of this invention is to provide a load leveling weight distributing hitch system which provides a thumb screw adjustment for the pitch of the ball hitch.

It is a still further object of this invention to provide a load leveling weight distributing hitch system with enhanced strength.

Another object of this invention is to provide a load leveling weight distributing hitch system with enhanced reliability by minimizing the use of attachment bolts.

These and other objects of this invention, which are readily apparent to those of ordinary skill in the art upon review of the following specification, drawings and claims, are achieved by a device which is described in the specific embodiment of this invention. Specifically, a hitch head is provided with a ball hitch attachment point, a towing vehicle attachment, two T-socket posts, two T-sockets, two spring bars having attachment points for stabilizer chains, and two lift units for imposing tension on the spring bars. Innovations in this design include a quick connect/disconnect for the spring bars, a tension adjustment system, and a thumb screw device for adjusting the pitch of the ball hitch.

BRIEF DESCRIPTION OF THE DRAWINGS

FIG. 1 is a system drawing showing two view of the load leveling weight distributing hitch system being used to connect a towing vehicle to a trailer.

FIG. 2 is a detail drawing showing five views of the preferred embodiment of the hitch head component of the invention.

FIG. 3 is a detail drawing showing three views of the preferred embodiment of the post component of the invention.

FIG. 4 is a detail drawing showing two views of the preferred embodiment of the T-socket component of the invention.

FIG. 5 is a detail drawing showing two views of the preferred embodiment of the spring bar component of the invention.

FIG. 6 is a detail drawing showing three views of the preferred embodiment of the spring bar lift component of the invention.

FIG. 7 is a detail drawing showing two views of the preferred embodiment of the spring bar lift lock component of the invention.

DETAILED DESCRIPTION OF THE INVENTION

This invention is a load leveling weight distribution hitch which uses a quick connect, quick disconnect spring bar attachment, a thumb screw ball hitch pitch adjustment, a spring bar lift having the ability to adjust the tension imposed on the spring bar, and spring bar lift lock, to provide a new hitch design which provides enhanced strength, reliability, ease of use and adjustments over weight distributing hitches in prior use.

Figure 1A:
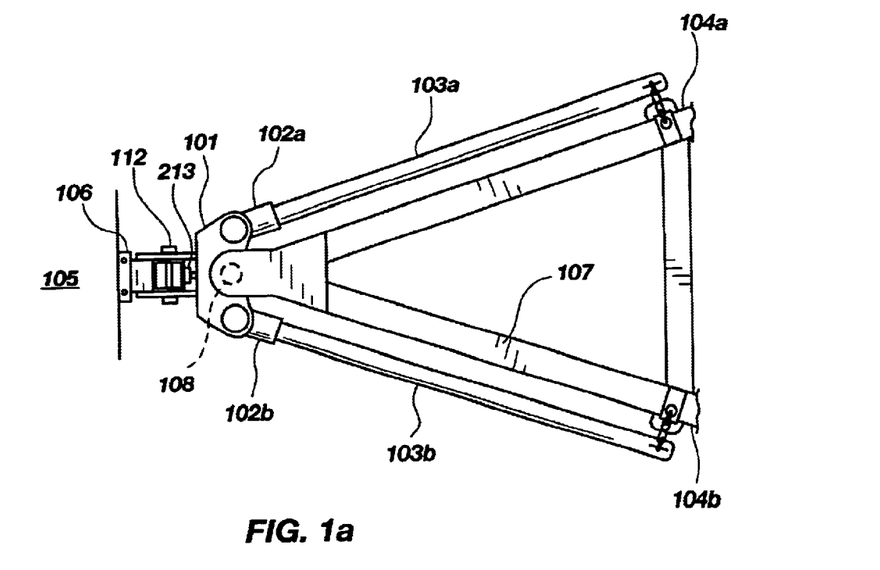
Figure 1B:
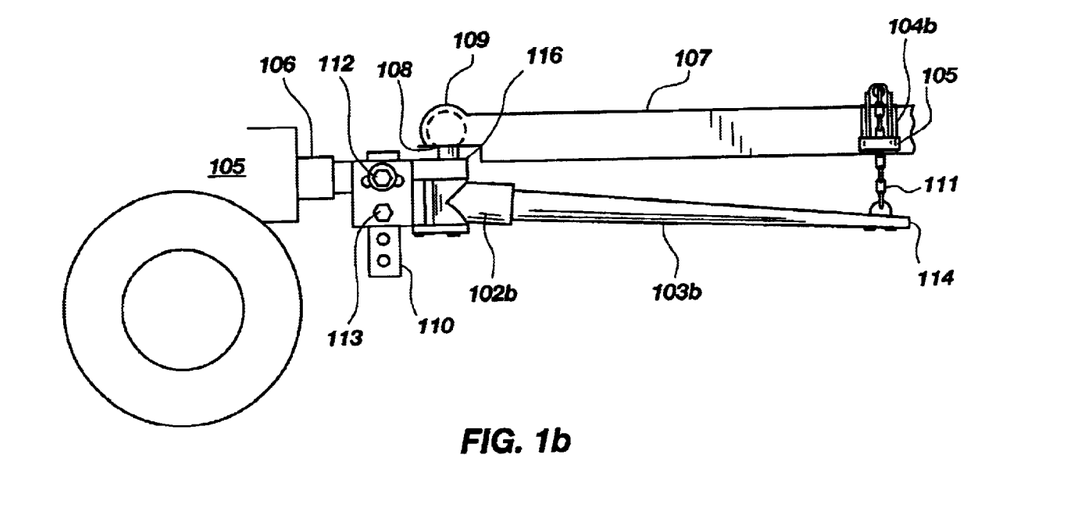

FIG. 1a and 1b depict the load leveling and weight distributing system showing the hitch being used to connect a towing vehicle to a trailer. FIG. 1a is a view from above the system of the invention. FIG. 1b is a side view showing the left side of the invention. The towing vehicle 105 has a standard hitch receiver 106 which is attached to an adjustable shank 110 which is fixed by bolts 112, 113 to the hitch head 101 of the invention, which in turn has two "T" sockets 102a, 102b. Each "T" socket 102a, 102b is shown having received the spring bars 103a, 103b. Each spring bar 103a, 103b has a chain 111 attached to its trailer end 114. The chain 111 is provided to control trailer sway. The chain 111 is connected to the trailer tongue 107 via a spring bar lift 104a, 104b. The spring bar lift 104a, 104b, has a sway control bracket 115 which is provided to keep the chain 111 fixed in place, thereby controlling the trailer sway. The trailer tongue 107 is connect to the hitch head 101 by a standard ball 108 and socket 109 connection. In the preferred embodiment of the invention, the component parts of the invention are composed of steel, although alternative materials, including synthetics may be used without departing from the concept of the invention.

Figure 2A:
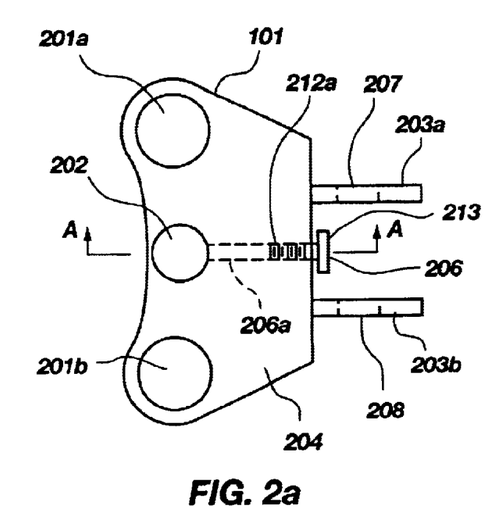
Figure 2B:
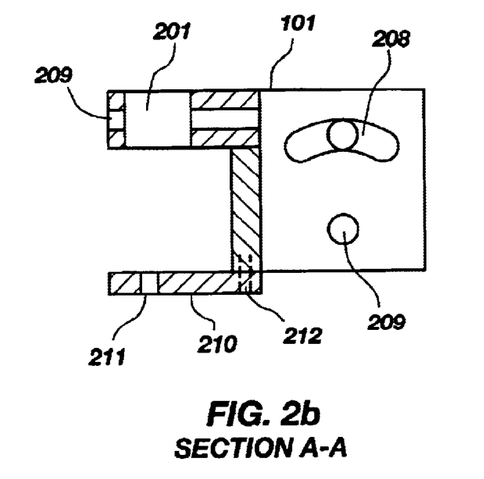
Figure 2C:
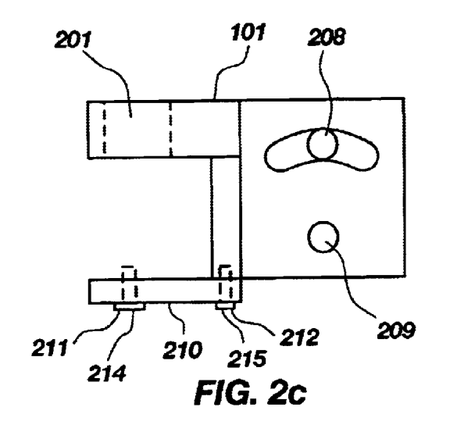
Figure 2D:
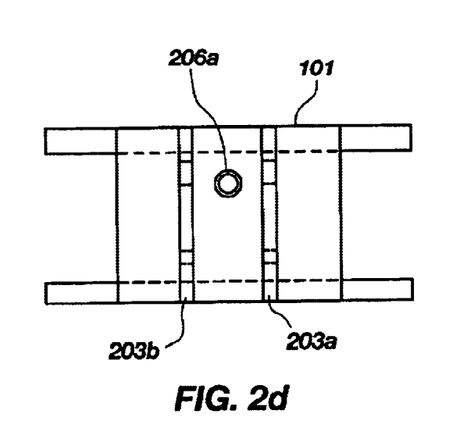
Figure 2E:
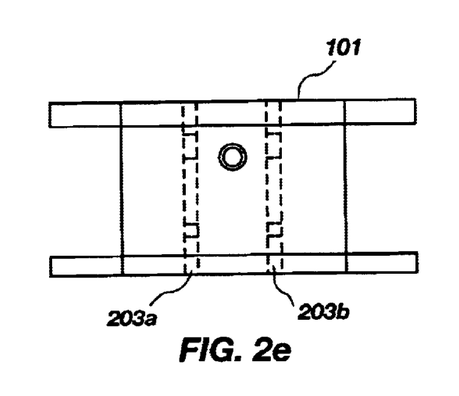

FIGS. 2a, 2b, 2c, 2d, and 2e show the detail drawing of five view of the preferred embodiment of the hitch head 101 component of the invention. FIG. 2a shows a top down view of the hitch head 101. FIG. 2b shows a section view along the line A—A of the hitch head 101. FIG. 2c shows the side view of the hitch head 101. FIG. 2d shows the rear view of the hitch head 101. And FIG. 2e shows the front view of the hitch head 101. The preferred hitch head 101 has a top surface 204 in which three openings are provided, a ball hitch attachment opening 202, which receives the ball stem 116, two T-socket post holes 201a,b, two shank mount plates 203a, 203b, each of which has two bolt openings 208, 209 for fixing the hitch head 101 to the adjustable shank 110. It can be seen that the top bolt opening 208 is provided as a slot which provides the user/installer with the capability of adjusting the pitch of the hitch head 101. Ball hitch 108 adjustment is provided by a thumb screw 206 having a drive end and a thumb head end which is installed through a threaded opening 209 and which by being turned by the user/installer the relative pitch of the ball can be adjusted. This ball hitch 108 adjustment is presently preferably accomplished by turning the thumb head end 213 of the thumb screw 206 thereby pressing the drive end 212a of the thumb screw 206 against to interact with the bolt opening 208 in order to provide adjustment to the pitch of the hitch head 101. In one preferred embodiment of this invention, a sway control adjustment plate 210 is provided, fixed to the bottom of the hitch head 101 by bolts 215 provided through bolt openings 212 and fixed to the bottoms of the T-socket posts by bolts 214 provided through bolt openings 211. A variety of hitch head sizes can be employed depending on the ball hitch, trailer tongue and desired spring bar pitch and tension, without departing from the concept of this invention.

Figure 3A:
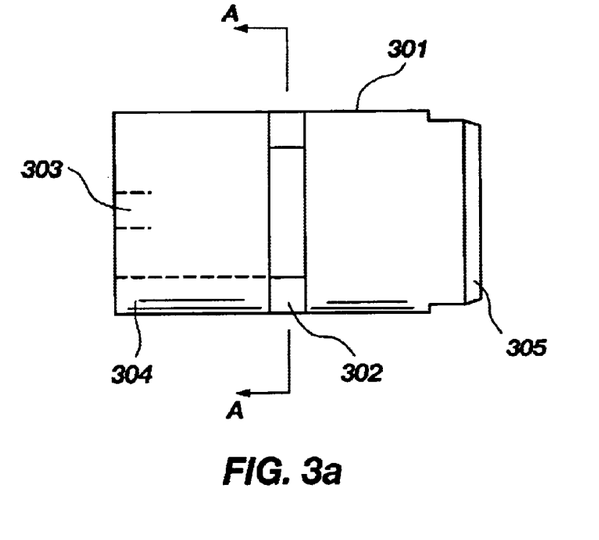
Figure 3B:
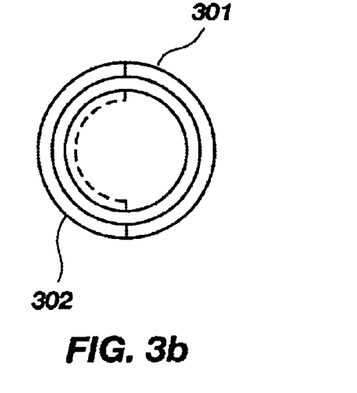
Figure 3C:
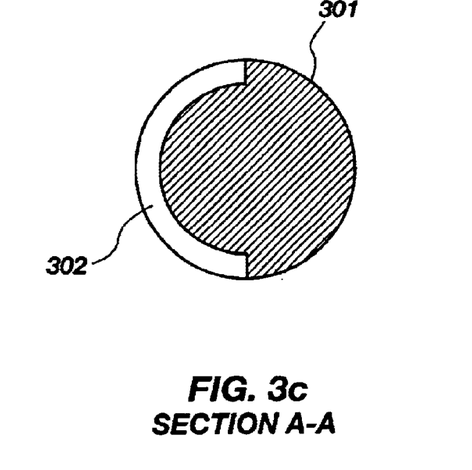
Figure 3D:
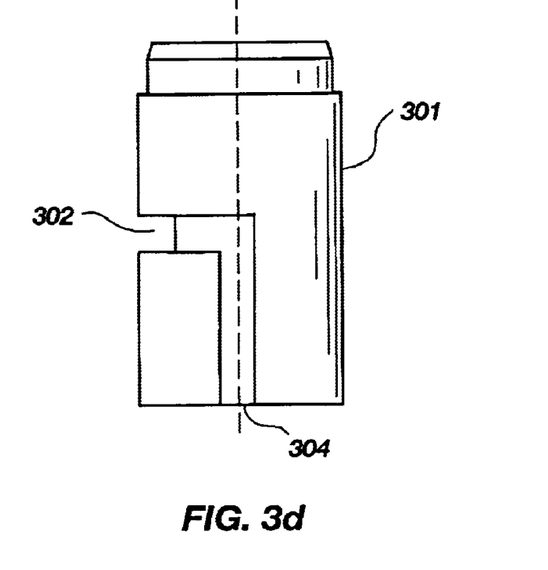

FIGS. 3a, 3b, 3c and 3d are detail drawings of the preferred embodiment of the post component of the invention. FIG. 3a shows a side view of the T-socket post 301, showing the T-socket rotation slot 302, which is a slot cut into the periphery of the T-socket post 301 and extending generally half way around the T-socket post 301, to provide an engagement with a T-socket pin 409, which is installed through a pin opening 403 in the T-socket 102, to allow the T-socket 102 to pivot approximately 180 degrees about the t-socket post 301. FIG. 3b shows the top down view of the preferred T-socket post 301. FIG. 3c shows a section view of the post 301 along the A—A section. FIG. 3d shows a side view of the T-socket post 301 which shows the T-socket installation slot 304. The post 301 is provided with a tapered end 305 which is press fitted into the post opening 201 of the hitch head 101. Once press fitted in, the post 301 is welded securely into place. A bolt hole opening 303 is provided in the event the sway control plate 210 is used. When installed each T-socket 102 is provided with a pin which passes through an opening in the T-socket to the T-socket rotation slot 302. This combination of the T-socket pin and the T-socket rotation slot provides the capability of rotating the spring bars 103 away from the trailer, thereby aiding in the installation and removal of the spring bars 103. The T-socket installation slot 304 is provided in order to allow the T-socket 102 to be installed on the post 301. Preferably, the post 301 is made from polished high strength steel. Alternative materials could be used without departing from the scope of this invention.

Figure 4A:
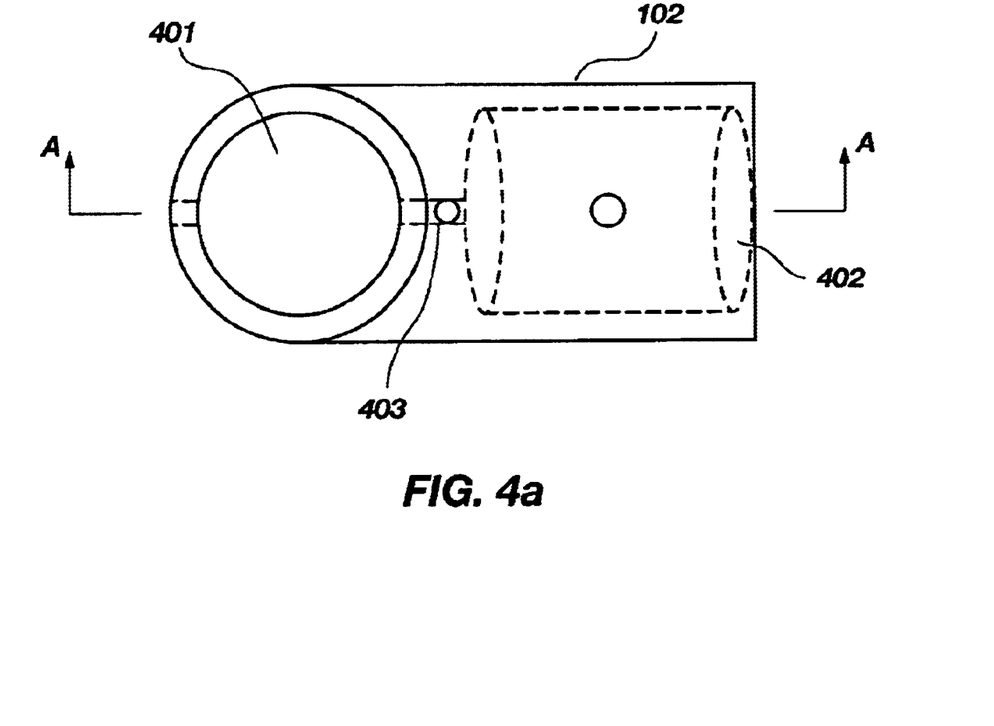
Figure 4B:
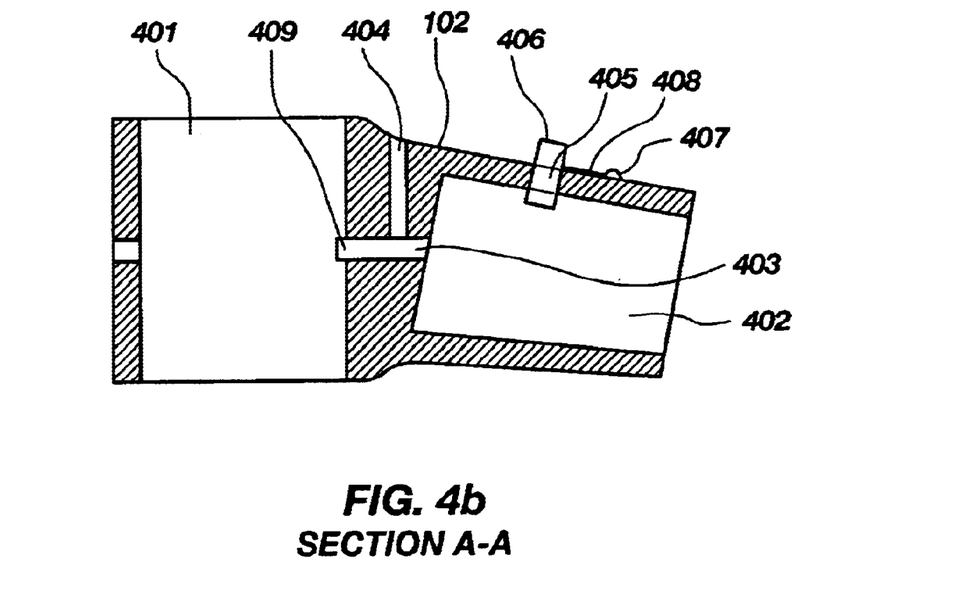

FIGS. 4a and 4b provide detail drawings showing two views of the preferred embodiment of the T-socket 102 component of the invention. FIG. 4a shows a top down view of the T-socket 102, while FIG. 4b shows a section view along the A—A line. A tube opening 401 is provided, which is installed over the post 301. A spring bar opening 402 is provided to receive the first end of the preferred spring bar 103. The pin opening 403 is provided to interact with the T-socket pin 409 and the T-socket rotation slot 302 to permit the t-socket 102 to rotate about the post 301. A set screw opening 404 is provide to fix the T-socket pin 409 in place. Also, provided in the T-socket is a retainer pin opening 405. The use of a retainer pin 406 which is held in place by a spring 408 pinned 407 to the T-socket, provides the quick connect/quick disconnect feature of this invention. This is accomplished in combination with the retainer pin slot 502 of the spring bar 103. When the spring bar 103 is installed in the T-socket 102 it is pushed straight in forcing the retainer pin 406 up and then down into the retainer pin slot 502. The retainer pin 406 being sprung to allow movement only on the insert of the spring bar 103 fixes the spring bar 103 in the T-socket. To remove the spring bar 103, it is rotated in either direction. Rotation of the spring bar 103 causes the retainer pin slot 502 to force the retaining pin 406 upwards, thereby releasing the spring bar 103. In the preferred embodiment of the invention the T-socket is pitched downward to induce tension in the spring bar 103. The preferred T-socket is composed of cast steel, although alternative materials could also be used without departing from the scope of this invention.

Figure 5A:
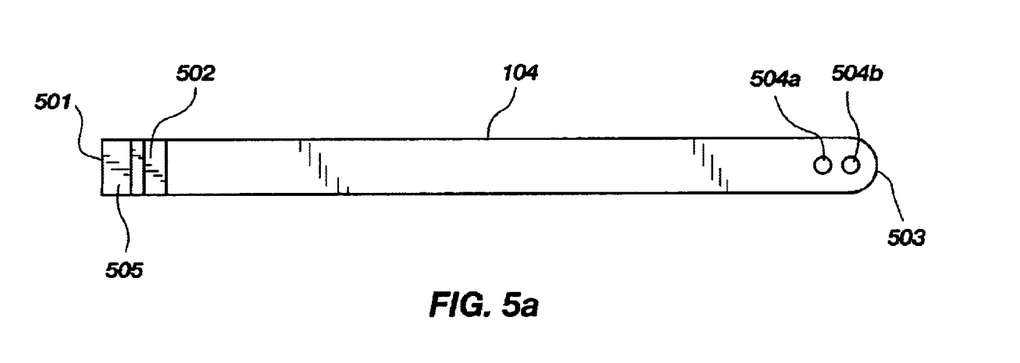
Figure 5B:
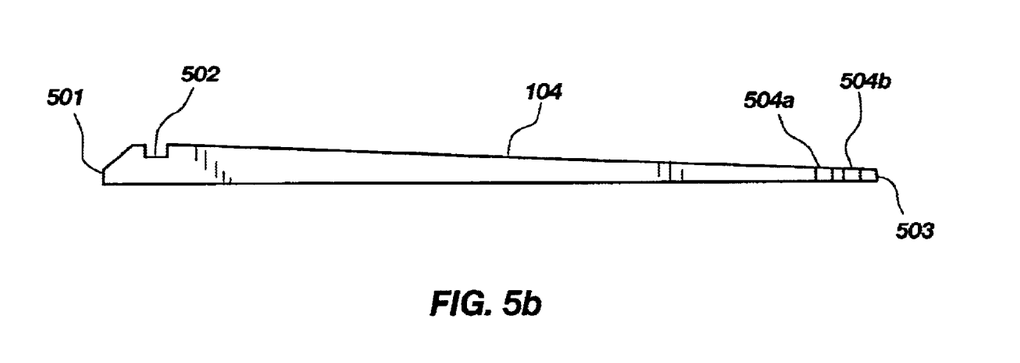

FIGS. 5a and 5b provide detailed drawing of the preferred embodiment of the spring bar component 103 of the invention. FIG. 5a show the top down view of the preferred embodiment of the spring bar component 103 of the invention. FIG. 5b shows the side view of the spring bar 103. The retainer pin slot 502 is shown for use as described above. A taper 505 is provided on the first end 501 of the spring bar 103. This taper 505 provides the means whereby the retainer pin 406 is forced upwards, allowing the spring bar 103 to be inserted and locked in place within the T-socket 102. The second end 503 of the spring bar 103 has two holes 504a, 504b which provide an access for attaching a tension chain 111. In the preferred embodiment of the invention, the spring bar 103 is made of steel, although alternative materials could be used without departing from the concept of this invention.

Figure 6A:
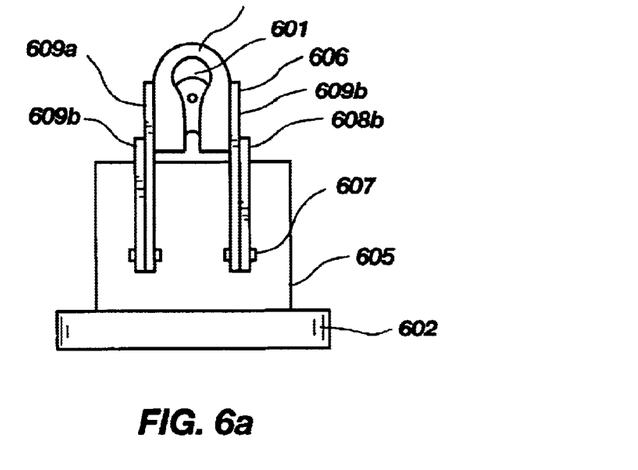
Figure 6B:
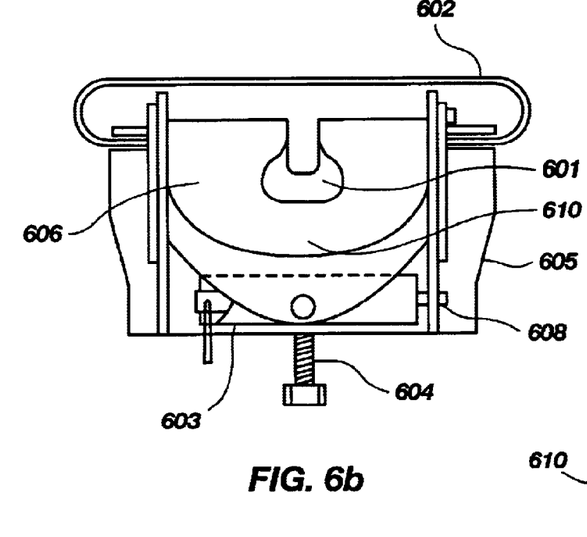
Figure 6C:
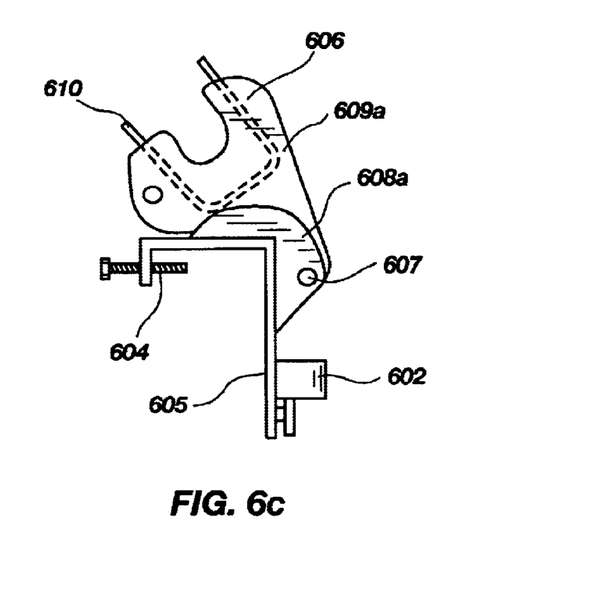

FIG. 6 is a detail drawing showing three views of the preferred embodiment of the spring bar lift component of the invention. FIG. 6a shows a top down view. FIG. 6b shows a front view and FIG. 6c shows a side view. The spring bar lift 104 is an improved version of commonly known spring bar lift type devices. The purpose is to receive one or more chain links into the opening 601 and then to leverage the lift upwards, by inserting a bar or other equivalent means, into the concave opening in the chain latch 606 to thereby lock the chain to the lift in a fixed position. Two important improvements to previously known spring bar lifts are provided in this invention. First, a chain retention loop 602 which is a generally oval loop, fastened typically by a weld, although other fastening means could be employed in alternative embodiments, to the inverted U-shaped element 605, within which chain 111 can be inserted to reduce chain 111 movement, is provided to maintain chain tension in a sway. Second, an improved lift lock 603 is provided. Additional detail on the improved lift lock 603 is provided below. Other features of the spring bar lift 104 include: a clamp devices 604 for fixing the lift 104 to the trailer tongue 107; an inverted U-shaped element 605 adapted to fit over the trailer tongue 107; and a pivotable chain latch 606 which pivots about a pivot point 607. The preferred pivotable chain latch 606 is a three piece structure having two side portions 609a, 609b and a center portion 610, the center portion 610 having within it the chain opening 601 and each side portion 609a, 609b being attached to a brace member 608a, 608b by a pivot point 607. The preferred pivotable chain latch 606 is a three piece structure having two side portions 609a, 609b and a center portion 610, the center portion 610 having within it the chain opening 601 and each side portion 609a, 609b being attached to a brace member 608a, 608b by a pivot point 607.

Figure 7A:
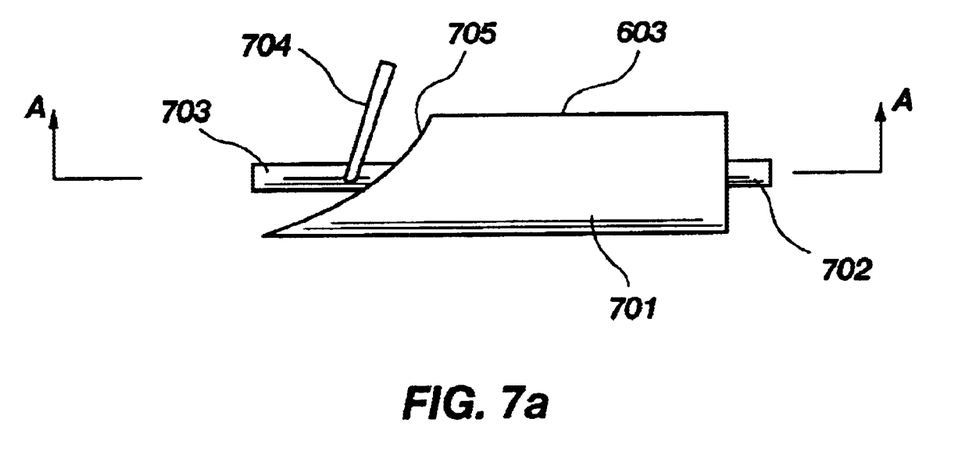
Figure 7B:
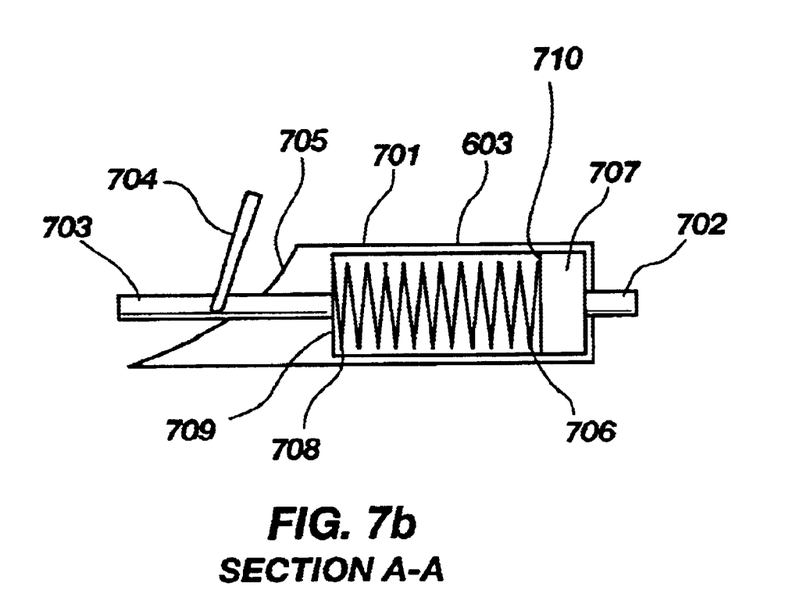

FIGS. 7a and 7b are detail drawings of the preferred embodiment of the lift lock component 603 of the invention. FIG. 7a is a side view and FIG. 7b is a section view cut along the A—A axis. The preferred embodiment of the lift lock has an exterior body 701 within which is installed a pivot pin 703 which in turn is held in a normally locked position by an internal spring 706 inserted within the exterior body 701, with one end 708 of the spring 706 against an interior wall 709 on tapered end 705 of the lift lock 603, and the other end 710 of spring against a piston 707 by pressure imposed on a piston 707 affixed to the locking post 702. In the normally locked position, the locking post end 702 engages an opening 608 in the pivotable chain latch 606. However, when the post 704 is rotated by the user along the tapered section 705 of the body 701 of the lift lock 603, the locking post 702 is withdrawn from the opening 608, thereby releasing the pivotable chain latch 606, and relaxing the tension on the chain.

The described embodiments of the invention are to be considered in all respects as illustrative only and not as restrictive. Although the embodiments shown here describe materials and specific interrelationships, these are to be considered only as descriptive of the current best mode of the invention as known to the inventors at the time the patent application is filed. The scope of this invention is, therefore, indicated by the appended claims rather than by the foregoing description. All changes which come within the meaning and equivalency of the claims are to be embraced within their scope.

I claim:

1. A load leveling weight distributing hitch system comprising:
   (A) a hitch head, having a bottom and further comprising a sway control plate fixed to said bottom of said hitch head by a bolt in a vertical orientation;
   (B) a first T socket post, having a T socket installation slot, attached to said hitch head;
   (C) a first T socket having a tube opening for receiving said first T socket post;
   (D) a first spring bar, having a first end, a second end and a hole at said second end, said first spring bar attached to said first T socket at said first end of said first spring bar; and
   (E) a spring bar lift attached to said first spring bar by a chain said chain being mechanically fixed to said first spring bar through said hole in said second end of said first spring bar.

2. A load leveling weight distributing hitch system, as recited in claim 1, wherein said T socket post further comprises: a tapered end, a bolt hole opening and a T socket rotation slot generally midway between said tapered end and said bolt hole opening.

3. A load leveling weight distributing hitch system, as recited in claim 1, wherein said first T socket further comprises springed retainer pin.

4. A load leveling weight distributing hitch system, as recited in claim 2, wherein said first T socket further comprises a T socket pin opening.

5. A load leveling weight distributing hitch system as recited in claim 1, wherein said first spring bar further comprises a tapered end to permit a quick connection with said T socket.

6. A load leveling weight distributing hitch system as recited in claim 1, wherein said first spring bar further comprises a retainer pin slot to permit a quick disconnect with said T socket by rotating said spring bar.

7. A load leveling weight distributing hitch system, as recited in claim 1, wherein said spring bar lift further comprises:
   (1) an inverted U-shaped element; and a chain retention loop fixed to said inverted U-shaped element, to maintain chain tension;
   (2) a pivotable chain latch, having an opening for receiving a locking post, to permit the selective increase in chain tension; and
   (3) a lift lock attached to said pivotable chain latch by said locking post.

8. A load leveling weight distributing hitch system, as recited in claim 7, wherein said lift lock further comprises:
   (a) an exterior body having a generally cylindrical shape with a tapered end;
   (b) a pivot pin positioned within said exterior body, said pivot pin being held in place by an internal spring; and
   (c) a post attached to said pivot pin and which permits a user to pivot said pivot pin thereby unlocking said lift lock.

9. A load leveling weight distributing hitch system, as recited in claim 8, wherein said lift lock further comprises a single piece shaft with an increase in internal dimension to retain a spring and a guide pin, thereby controlling said post.

10. A load leveling weight distributing hitch system, as recited in claim 1, wherein said hitch head further comprises:
   (1) a mount for attaching said hitch head to a hitch shank;
   (2) a ball hitch fixture attached to said hitch head to provide an attachment to a trailer; and
   (3) a thumb screw adjustment, comprising a threaded opening within said hitch head and a thumb screw installed in said threaded opening, the thumb screw having a head end configured to press against the shank, so as to control the pitch of said ball hitch fixture.

* * * * *